Oct. 21, 1924.
M. J. KONETSKY
TRACTOR HITCH
Filed Feb. 14, 1924
1,512,611
2 Sheets-Sheet 2
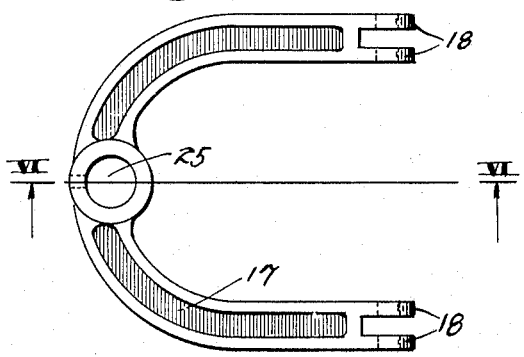
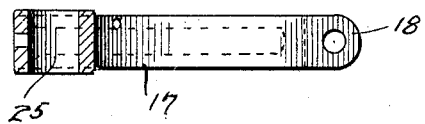
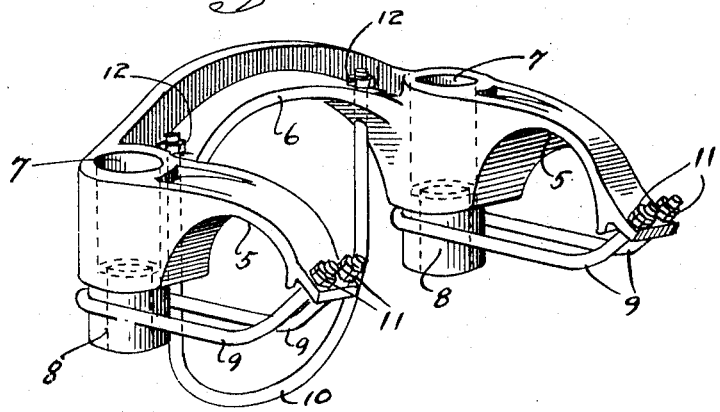
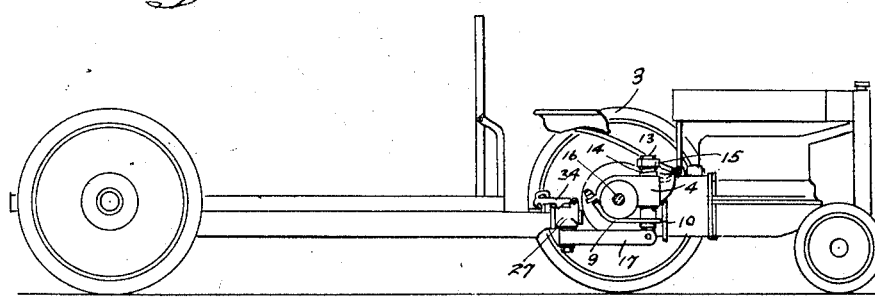
Inventor
MILTON J. KONETSKY
By
Attorneys Patented Oct. 21, 1924.

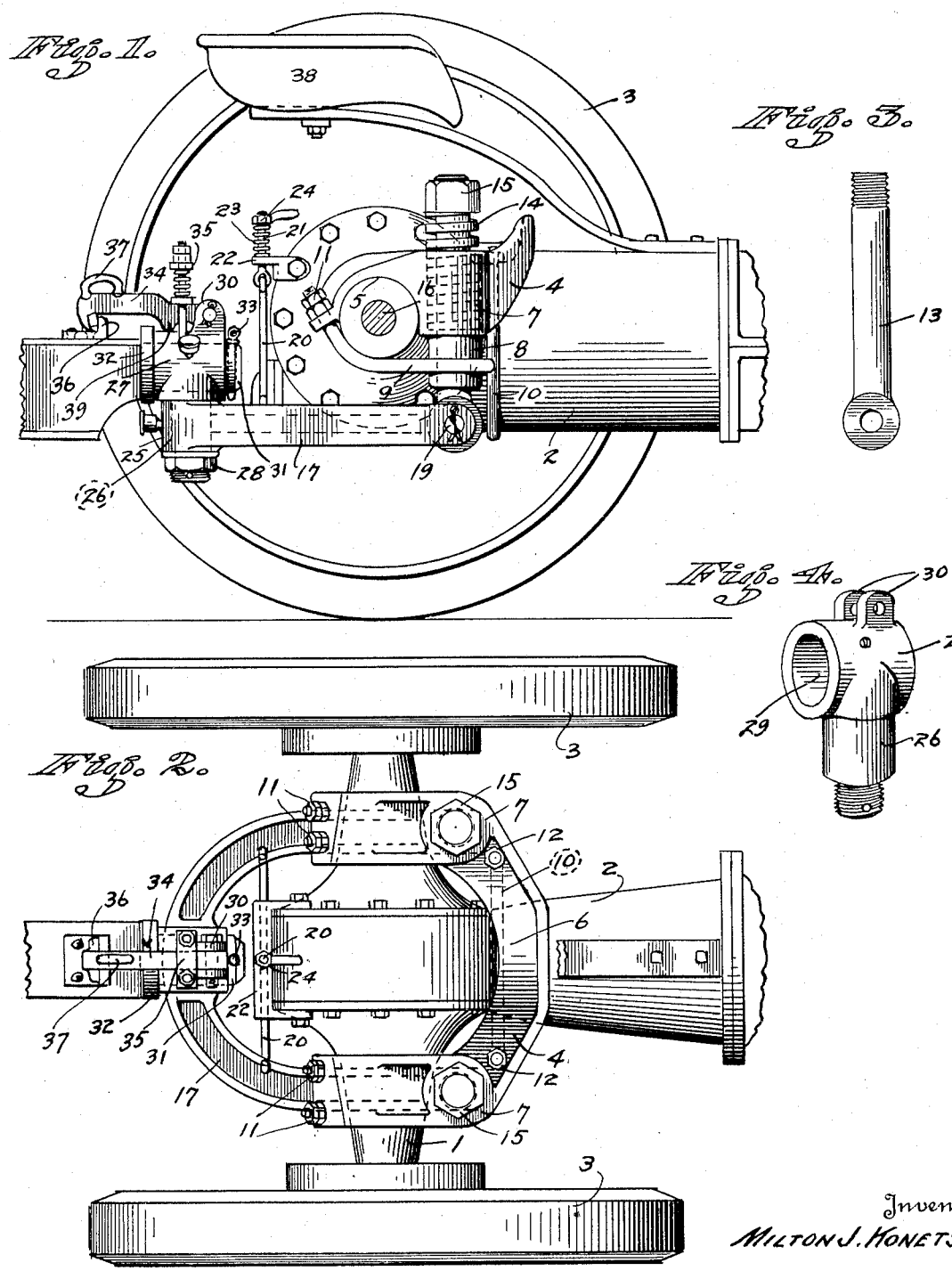

1,512,611

UNITED STATES PATENT OFFICE.

MILTON J. KONETSKY, OF SAN FRANCISCO, CALIFORNIA.

TRACTOR HITCH.

Application filed February 14, 1924. Serial No. 692,861.

*To all whom it may concern:*

Be it known that I, MILTON J. KONETSKY, a citizen of the United States, and a resident of San Francisco, county of San Francisco, State of California, have invented a new and useful Tractor Hitch, of which the following is a specification.

This invention relates to coupling devices for tractors and motor cars for connecting to trailing vehicles or devices of any kind and has for its principal objects an arrangement which may be quickly applied to an automobile especially of the tractor type and which will cooperate with the trailing vehicle in tending to hold the tractor to the ground, also a device which gives perfect freedom to the vehicles, will permit turning in a small radius, and which may be instantly released from connection with the trailing vehicle when desired, and all these features in a coupling which is simple in construction, easy to manufacture and very durable in use.

I attain the objects outlined by the arrangement shown in the accompanying drawings and in which:—Figure 1 shows the rear end of a tractor with the rear wheel omitted and my coupling in place with the bar of a trailer connected in position; Figure 2 is a plan view of Figure 1 with both tractor wheels in place; Figure 3 shows one of the suspension eye bolts; Figure 4 shows the socket for receiving the trailer bar; Figure 5 is the eye bolt yoke in plan; and Figure 6 the same in sectional elevation; Figure 7 shows the draft hook; Figure 8 the saddle for the transmission housing; and Figure 9 illustrates the tractor and trailer connected by means of my coupling.

In further detail the drawings show at (1) the rear axle housing of a tractor, (2) the transmission housing, (3) the wheels, (4) a cast saddle member having three curved seats, one at each side of the differential housing on top of the axle housing and one on top of the transmission housing as shown.

In Figure 8 these seats are clearly shown, the axle housing seats being numbered (5) and the transmission housing seat (6). The saddle casting is preferably made of steel and suitably ribbed for strength as shown, and the axle housing seats project at right angles to the seat members (6) and at the juncture of the members are two tubular sockets (7), having cylindrical lower extentions (8).

The saddle is placed over the housings as shown in Figures 1 and 2 and strapped in place by straps (9) and (10) passing under the housing and drawn tight by means of bolts (11) and (12) in the manner indicated in Figure 8 and from which it will be seen that the member may be immovably strapped over the housing.

A pair of eye bolts (13) are passed upward through the sockets (7) and a heavy spring (14) surrounds each bolt resting on a shoulder within the socket and surmounted by a nut (15) as shown in Figure 1, and it should be noted that these bolts hang on the springs and that the springs are very heavy as they are intended also to carry a considerable part of the trailer load as well. It should also be observed that these bolts and springs are forward of the rear axle (16) so that the load is suspended from a point on the housing forward of the axle so as to force the forward end of the tractor downward from the axle as a pivotal point.

Extending rearwardly and passing under the axle housing is a U-shaped link or yoke (17) having ears (18) at both ends engaging the eye bolts and being pinned thereto at (19) so that the yoke is free to swing in a vertical plane in the eye bolts.

To prevent the rear end of the yoke from falling when not connected to a trailer, it is suspended on a bale (20) having an eyebolt connection (21) passing through a bracket (22) surmounted by a spring (23) and secured by a lever nut (24) for adjustment to raise or lower the yoke.

At the rear end of the yoke is a vertical socket (25) adapted to receive the lower cylindrical end (26) of a swivel connection (27) held in place by a nut (28). The upper end of the connection (27) is formed with a cylindrical socket (29) at right angles to the end (26) and is surmounted by a pair of ears (30).

The socket (29) is adapted to project horizontally rearward of the tractor to receive the round end of the draw bar of a trailer, as indicated at (31) in Figures 1 and 2. The round end of the draw bar is tapered slightly at the extreme end so that it will readily find its way into the socket when the trailer is backed into it, and a flange or shoulder (32) is provided to take the thrust for backing up.

A pin (33) is dropped through a hole in the forwardly projecting end of the bar (31) to prevent accidental pulling out, but the load is pulled by a heavy snap hook (34) pivoted between the ears (30) and forced downward by a suitable spring arrangement (35).

The hook engages a small angle (36) or lug secured to the trailer pole or bar, and on the end of the hook is a ring (37) by which it may be released by the tractor driver sitting on the tractor seat (38).

A stop (39) on the hook prevents it falling too far so that it will always be in the proper position to snap in place when coupling the trailer, and the jaw of the hook is slightly rounded as indicated at (40) so that it will rock slightly on the angle plate (36) during the swivelling of the coupling connection when the tractor and trailer are passing over uneven ground.

By reference to Figure 1 where the parts are all shown connected it will be observed that the pivot (26) permits of lateral turning of the vehicles, pivots (19) longitudinal variation of angle, and pivot (31) takes care of the twisting movement, also that the weight of the forward end of the trailer hangs on the springs (14) in front of the tractor axle and that due to the saddles strapped rigidly to the tractor housing the weight of the forward portion of the trailer as well as the pulling effort forces the forward end of the tractor downward, preventing it rearing backward through its own power as is now the case with couplings pulling from an upper or intermediate point.

I claim:

1. A tractor hitch comprising a pair of saddles adapted to strap over the top of the rear axle housing of a tractor one to either side of the differential housing, and a transverse member connecting the saddles adapted to bear upon the housing just forward of the differential, and a rearwardly projecting draft yoke connected to the saddles below the differential housing on opposite sides thereof and forward of the rear axle.

2. A tractor hitch comprising a pair of saddles adapted to strap over and rest upon the rear axle nousing of a tractor, one to either side of the differential housing, a transverse member connecting the saddles adapted to bear upon the housing just forward of the differential, a vertically slidable eye bolt resiliently supported in each saddle at its juncture to the transverse member, and a rearwardly projecting draft yoke connected at its free ends, respectively, to both eyes of the bolts at a point below and forward of the rear axle of the tractor.

3. In combination with a tractor having a rear axle and a running gear housing, a rearwardly extending yoke pivotally suspended from the housing and having a swivel draft connection at its rear end, said connection comprising a vertical and a horizontal pivotal socket, the latter being adapted to receive the round end of a trailer or other draft bar.

4. In combination with a tractor having a rear axle and a running gear housing, a rearwardly extending yoke pivotally suspended from the housing and having a swivel draft connection at its rear end, said connection comprising a vertical and a horizontal pivotal socket, the latter being adapted to receive the round end of a trailer or other draft bar, and a draft hook adapted to engage with the bar for pulling the trailer.

5. In a tractor hitch of the character described, a triple saddle casting adapted to rest in three places on the top of the differential gear housing of a tractor, two of said places being at the sides of the housing and one at the forward portion of the housing, and straps under each saddle for strapping them tightly to the housing.

MILTON J. KONETSKY.